(12) United States Patent
Staufer (10) Patent No.: US 11,754,286 B2
(45) Date of Patent: Sep. 12, 2023

(54) COMBUSTION CHAMBER ASSEMBLY WITH SPECIFICALLY ARRANGED MIXING AIR HOLES ON INNER AND OUTER COMBUSTION CHAMBER WALL

(71) Applicant: Rolls-Royce Deutschland Ltd & Co KG, Blankenfelde-Mahlow (DE)

(72) Inventor: Max Staufer, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 0 days.

(21) Appl. No.: 17/965,193

(22) Filed: Oct. 13, 2022

(65) Prior Publication Data

US 2023/0194089 A1 Jun. 22, 2023

(30) Foreign Application Priority Data

Dec. 16, 2021 (DE) .................... 10 2021 214 499.3

(51) Int. Cl.
*F23R 3/06* (2006.01)
*F23R 3/00* (2006.01)

(52) U.S. Cl.
CPC ............... *F23R 3/06* (2013.01); *F23R 3/002* (2013.01)

(58) Field of Classification Search
CPC .... F23R 3/002; F23R 3/06; F23R 3/50; F23R 3/54
See application file for complete search history.

(56) References Cited

U.S. PATENT DOCUMENTS 6,434,821 B1 8/2002 Nelson et al.
8,141,365 B2 3/2012 Bronson et al.
(Continued)

FOREIGN PATENT DOCUMENTS

DE 102014226707 A1 6/2016
DE 102019105442 A1 9/2020
(Continued)

OTHER PUBLICATIONS

Sumendran, J. et al. "Design of Annular Combustion Chamber with Different Types of Swirl to Perform Pressure Drop", International Journal of Scientific and Technology Research, vol. 9, Iss. 02, Feb. 2020, pp. 1972-1975 (Year: 2020).*
(Continued)

*Primary Examiner* — Scott J Walthour
(74) *Attorney, Agent, or Firm* — SHUTTLEWORTH & INGERSOLL, PLC; Timothy Klima (57) ABSTRACT

A combustion chamber for an engine includes inner and outer combustion chamber walls bounding a combustion space. Three mixing air holes with respective central points at corner points of a virtual first or second triangle are arranged on mutually opposite first and second wall segments of the inner and outer walls. The second triangle of the second wall segment of the outer wall is oriented rotated by 180° with respect to the first triangle of the first wall segment of the inner wall, and the mixing air holes arranged in rows on the first and second wall segments are arranged with respect to one another so the mixing air holes of the first and second wall segments that are arranged at the corner points of the first and second triangles do not lie opposite a mixing air hole of the second or first wall segment.

8 Claims, 6 Drawing Sheets

(56) References Cited

U.S. PATENT DOCUMENTS

2010/0218503 A1* 9/2010 Bronson .................. F23R 3/50
                                                                               60/754

2016/0169517 A1    6/2016 Graves et al.

FOREIGN PATENT DOCUMENTS

EP       2224168 A2   9/2010
EP       3306196 A1   4/2018

OTHER PUBLICATIONS

German Search Report dated Jul. 14, 2022 from counterpart German Patent Application No. 10 2021 214 499.3.

* cited by examiner

COMBUSTION CHAMBER ASSEMBLY WITH SPECIFICALLY ARRANGED MIXING AIR HOLES ON INNER AND OUTER COMBUSTION CHAMBER WALL

This application claims priority to German Patent Application 102021214499.3 filed Dec. 16, 2021, the entirety of which is incorporated by reference herein.

The proposed solution relates to a combustion chamber assembly for an engine.

A combustion chamber assembly for an engine basically comprises a combustion chamber, the combustion space of which is bounded by inner and outer combustion chamber walls. For example, the combustion chamber is designed as an annular combustion chamber with a radially inner combustion chamber wall and a radially outer combustion chamber wall. The combustion space extends here along a central axis in an axial direction from a first axial end with a combustion chamber head to a second axial end at which exhaust gases arising in the combustion space during the combustion are conducted to a turbine of the engine in order to generate thrust.

For the combustion in the combustion space, mixing air holes via which mixing air can be conducted into the combustion space are regularly provided on the outer and inner combustion chamber wall. It is known from EP 3 306 196 A1 in particular to arrange mixing air holes both on the inner and on the outer combustion chamber wall in rows following one another in an axial direction, wherein the distances between the mixing air holes within the rows and the distances of the rows from one another are specifically predefined such that the mixing air holes are arranged in a certain pattern. In particular, EP 3 306 196 A1 proposes arranging mixing air holes offset with respect to one another in each case in rows on the combustion chamber walls in order to set a certain mixing air flow within the combustion space downstream of a fuel nozzle of the combustion chamber assembly. It is considered advantageous here in particular to arrange mixing air holes of the inner and outer combustion chamber walls to lie opposite one another such that a mixing air flow from a mixing air hole of the one combustion chamber wall is conducted in the direction of a mixing air flow from a mixing air hole of the other combustion chamber wall.

However, it has now been shown that, in particular in the case of combustion chambers which have a comparatively large so-called pitch-height ratio, mixing air arrangements known from the prior art are not always advantageous. A pitch is understood here as meaning a width, measured in the circumferential direction, of a face-side heat shield segment on which one of a plurality of fuel nozzles provided distributed in the circumferential direction on a head section of the combustion chamber is arranged. A decisive height for the pitch-height ratio is furthermore understood as meaning the height of the heat shield segment, the height corresponding to the distance between the inner combustion chamber wall and the outer combustion chamber wall at the first axial end of the combustion chamber. In particular in the case of engines with combustion chambers which have a comparatively large pitch-height ratio, there is a need for an improved arrangement of mixing air holes in order to achieve an effective local mixing of injected fuel and mixing air and in particular to reduce NOx emissions.

A combustion chamber assembly as disclosed herein provides a remedy for this.

A combustion chamber assembly is thus proposed, in which both the inner combustion chamber wall and the outer combustion chamber wall are each divided in the circumferential direction into wall segments on which the mixing air holes are in each case arranged in a predefined pattern. The mixing air holes are consequently arranged in patterns, which are repetitive segment by segment per se, on the inner and outer combustion chamber walls. According to the proposed solution, it is now furthermore provided that three mixing air holes of two rows following one another in the axial direction are arranged with their respective central points at corner points of a virtual first triangle on a first wall segment of the inner combustion chamber wall, and three mixing air holes of two rows following one another in the axial direction are arranged with their respective central points at corner points of a virtual second triangle on a second wall segment of the outer combustion chamber wall, which wall segment lies opposite the first wall segment. The second triangle is oriented here rotated by 180° with respect to the first triangle, and the respective mixing air holes are arranged with respect to one another in the rows on the first and second wall segments in such a manner that the mixing air holes of the first and second wall segments that are arranged at the corner points of the first and second triangles in each case do not lie opposite a mixing air hole of the (respective other) second or first wall segment.

A group of three mixing air holes on the outer (second) combustion chamber wall is therefore arranged locally and segment by segment in an inverse manner to a first group of three mixing air holes on the inner (first) combustion chamber wall. This results in an axial offset between the three mixing air holes on the first inner wall segment and on the second outer wall segment. The arrangement of the mixing air holes provided with the proposed solution is therefore based on a specific pattern which has proven particularly advantageous in practice specifically for combustion chambers with a comparatively large pitch-height ratio. The mutually inverse arrangement of the group of three mixing air holes is based on the approach of producing, in a comparatively small construction space, three in each case jet-like mixing air flows on the first combustion chamber wall and three likewise in each case jet-like mixing air flows on the opposite other combustion chamber wall, wherein the then six mixing air flows are conducted into the combustion space in the circumferential direction and axially offset with respect to one another. It has been shown that this can produce a zone of mixing air which is particularly advantageous for a fuel injected directly therein if the combustion chamber has a comparatively low height. Accordingly, in one embodiment variant, the arrangement of the first and second wall segments with the proposed mixing air hole arrangement is provided directly downstream of a fuel nozzle of the combustion chamber assembly. A nozzle head of a fuel nozzle of the combustion chamber assembly is therefore assigned to a respective pair of first and second wall segments.

In one embodiment variant, the first triangle and the second triangle, which define the positioning of the mixing air holes on the first inner wall segment and on the second outer wall segment, are both isosceles triangles. Nevertheless, so that this furthermore does not exclude an axial offset between the two triangles and therefore in particular between the rows of mixing air holes provided on different wall segments, the specification of the positions of the mixing air holes over two isosceles triangles facilitates a more greatly symmetrical arrangement of the mixing air holes. Such a symmetrical arrangement of the triangles (and therefore the mixing air holes thereby predefined in their position) includes, for example, that the tip of at least one of the triangles lies on the base of the other triangle. For example, it is thus provided, in one embodiment variant, that the tip of the first isosceles triangle and the tip of the second isosceles triangle each lie on the base of the respective other triangle.

Alternatively or additionally, in a top view along a viewing direction which runs perpendicularly to the axial direction and perpendicularly to the circumferential direction (and therefore runs radially, for example, with respect to the central axis of the combustion chamber), the tip of the first isosceles triangle and the tip of the second isosceles triangle lie on an axis of symmetry, with respect to which, in this top view, a first pattern of the mixing air holes on the first wall segment is (axially) symmetrical, and with respect to which, likewise in the top view, a second pattern of the mixing air holes on the second wall segment is (axially) symmetrical.

The axis of symmetry can run here in particular parallel to a nozzle axis along which a nozzle head of a fuel nozzle which is provided for injecting fuel into the combustion chamber and belongs to the combustion chamber assembly extends. In such a way, the two mixing air holes provided at the tips of the isosceles triangles lie directly downstream of the nozzle head in the axial direction. Furthermore, the total of six mixing air nozzles, which are predefined in their position via the first and second triangles, on the inner combustion chamber wall and the outer combustion chamber wall define a locally delimited mixing air zone directly downstream of the nozzle head, for which the six mixing air holes are offset axially and in the circumferential direction with respect to one another.

In principle, the dimensions of the mixing air holes, in particular the diameters thereof in the case of circular mixing air holes, can differ from one another, both within a respective row or on a wall segment, but also depending on whether the mixing air hole is provided on the inner or the outer combustion chamber wall. However, provision may also be made for the dimensions of the mixing air holes to be identical to one another.

In an embodiment variant of the proposed solution, in which in particular the groups of mixing air holes on the opposite wall segments are positioned with a certain symmetry with respect to one another, the first isosceles triangle and the second isosceles triangle are identical. This is understood as meaning that the base and the legs of the triangles each have the same length, and therefore the central points of the mixing air holes thereby defined in their position on the respective wall segment are spaced apart equally from one another on the first (inner) and the second (outer) wall segment.

In one embodiment variant, on a wall segment, in addition to the group of mixing air holes, the position of which is predefined via the respective first or second triangle, further mixing air holes are also provided, for example at least two mixing air holes per wall segment. For example, a front row (with respect to the axial direction) with two or three mixing air holes and a rear row with three or two mixing air holes are provided on the first wall segment and/or on the second wall segment. Also with regard to the further mixing air holes, a certain manner of positioning and therefore a specific pattern per wall segment for certain combustion space geometries and dimensions have proven advantageous here. For example, a distance measured in the circumferential direction between the one mixing air hole (the central point of which is provided at a corner point of the first or second triangle) and a further mixing air hole—within a row—is selected to be greater than a distance of the further mixing air hole from a mixing air hole, which follows it (directly) in the circumferential direction and is therefore adjacent to it, of a wall segment which is adjacent in the circumferential direction. Mixing air holes, which are adjacent to one another in the circumferential direction, of wall segments which are adjacent to one another are consequently positioned here closer to one another than mixing air holes, which follow one another in the circumferential direction, of the same row of a wall segment. At a segment boundary between wall segments, which are adjacent to one another, of the inner or outer combustion chamber wall, mixing air holes are then consequently at a smaller distance in the circumferential direction than within a row of a wall segment. In a region of the inner or outer combustion chamber wall, which region is defined by a wall segment and adjoins a nozzle head of a fuel nozzle downstream in the axial direction, a greater distance is therefore provided between the mixing air holes within a row than in each case at an edge region defined by a segment boundary. The mixing air flows correspondingly predefined via such a mixing air arrangement during the operation of the engine can ensure a greater localization of the mixing air at the edge regions downstream of the nozzle head and a simultaneously improved moderating of the temperature even at the edge regions.

For example, the distance between the one mixing air hole (the central point of which is provided at a corner point of the first or second triangle) and the at least one further mixing air hole of a wall segment is twice as large as the distance of the at least one further mixing air hole from the mixing air hole, which follows in the circumferential direction, of the adjacent (next) wall segment of the inner or outer combustion chamber wall.

In particular, the distance between the one mixing air hole and the further mixing air hole which lies at a corner point of a respective first or second triangle and belongs to the same row (the front or rear row with respect to the axial direction) on the respective first or second wall segment can be defined depending on a side length of the respective triangle. For example, for certain combustion space geometries and dimensions, it has proven advantageous if said distance in the case of mixing air holes which are positioned via a first or second isosceles triangle and belong to a wall segment corresponds to the length of the base of the respective isosceles triangle. In particular in the case of such a spacing, it can be effectively (more effectively) achieved via a mixing air flow flowing in laterally that hot gas flows are cooled to a greater extent and are at least partially pushed in the direction of a central region downstream of a nozzle head of a fuel nozzle.

In one embodiment variant, it is provided that, in the region of the segment boundaries, the mixing air holes of two wall segments which are adjacent to one another are provided offset axially with respect to the mixing air holes of two opposite wall segments which are adjacent to one another of the other combustion chamber wall. That is to say, for example, that two mixing air holes which follow one another in the circumferential direction on a segment boundary do not lie opposite any mixing air holes on the opposite pair of wall segments. While, for example, in an extension of a front row on the inner combustion chamber wall, two mixing air holes of two adjacent wall segments follow one another at a comparatively small distance, no mixing air holes are provided in the region of the opposite segment boundary in an extension of a front row of the outer combustion chamber wall. Instead, two mixing air holes on two adjacent wall segments are provided on the outer combustion chamber wall in an extension of a rear row, while no mixing air holes are provided opposite in an extension of a rear row of the inner combustion chamber wall.

In one embodiment variant, a total of just precisely five mixing air holes are provided in two rows following one another in the axial direction (and therefore optionally on the wall segment in general) per wall segment. Three mixing air holes are therefore in each case positioned at the corner points of the respective first or second virtual triangle while, in addition, two further mixing air holes are provided in another row. The mixing air holes which are provided on mutually opposite first and second wall segments can be offset axially to one another here, and therefore opposite a mixing air hole of a first wall segment there is only ever a wall section of the other wall segment without a mixing air hole.

With regard to as uniform a temperature distribution as possible in a fuel-air mixture which is formed and as great a thorough mixing as possible with the aid of the inflowing mixing air, it can furthermore be of advantage, specifically in conjunction with the proposed mixing air hole arrangements, to predefine the distances between the rows of mixing air holes on a wall segment with respect to a distance between the combustion chamber walls. For example, it has been shown that an axial distance (measured in the axial direction) between two rows of mixing air holes on a wall segment in a range of 0.05 d to 0.4 d is of advantage, where d defines the distance between the first and second opposite wall segments of the inner and outer combustion chamber walls. An axial row distance is therefore set in relation to a (wall) distance d. Row distance and wall distance are therefore at a certain ratio to each other, wherein the row distance of the mixing air holes is made dependent in a specific manner on the wall distance. By this means, in particular in the case of a combustion chamber with a comparatively large pitch-height ratio, a compact local mixing zone can then arise downstream of a fuel nozzle.

A further aspect of the proposed solution relates to the provision of an engine, in particular a gas turbine engine and here in particular a turbofan engine, with an embodiment variant of a proposed combustion chamber assembly.

The attached figures illustrate by way of example possible embodiment variants of the proposed solution.

In the figures.

Figure 4A:
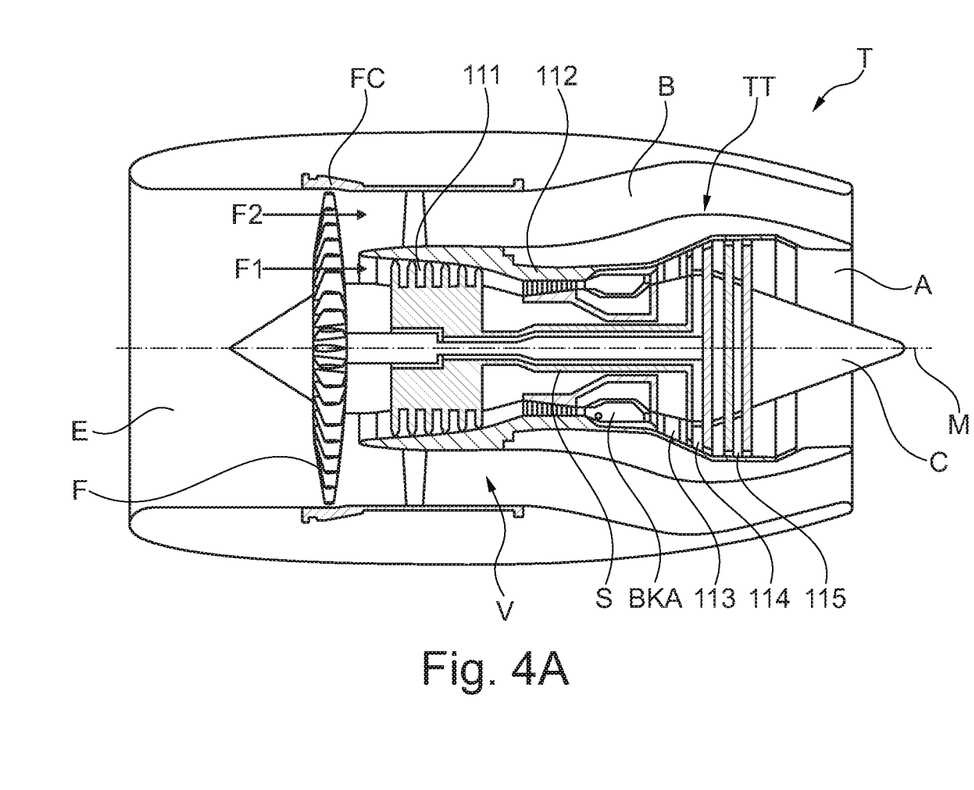
FIG. 4A shows a schematic sectional illustration of a gas turbine engine, in which a proposed combustion chamber assembly is used.

FIG. 4A illustrates, schematically and in a sectional illustration, a (turbofan) engine T in which the individual engine components are arranged one behind another along an axis of rotation or central axis M, and the engine T is formed as a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. Here, the turbine TT adjoins a compressor V, which comprises, for example a low-pressure compressor 111 and a high-pressure compressor 112, and possibly also a medium-pressure compressor. On the one hand, the fan F conducts air in a primary air flow F1 to the compressor V, and, on the other hand, to generate thrust, in a secondary air flow F2 to a secondary flow duct or bypass duct B. The bypass duct B here runs around a core engine comprising the compressor V and the turbine TT and comprising a primary flow duct for the air supply to the core engine by the fan F.

The air conveyed into the primary flow duct by means of the compressor V passes into a combustion chamber BK of the core engine, in which the drive energy for driving the turbine TT is generated. For this purpose, the turbine TT has a high-pressure turbine 113, a medium-pressure turbine 114 and a low-pressure turbine 115. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. In this arrangement, the outlet A generally has a thrust nozzle with a centrally arranged outlet cone C.

Figure 4B:
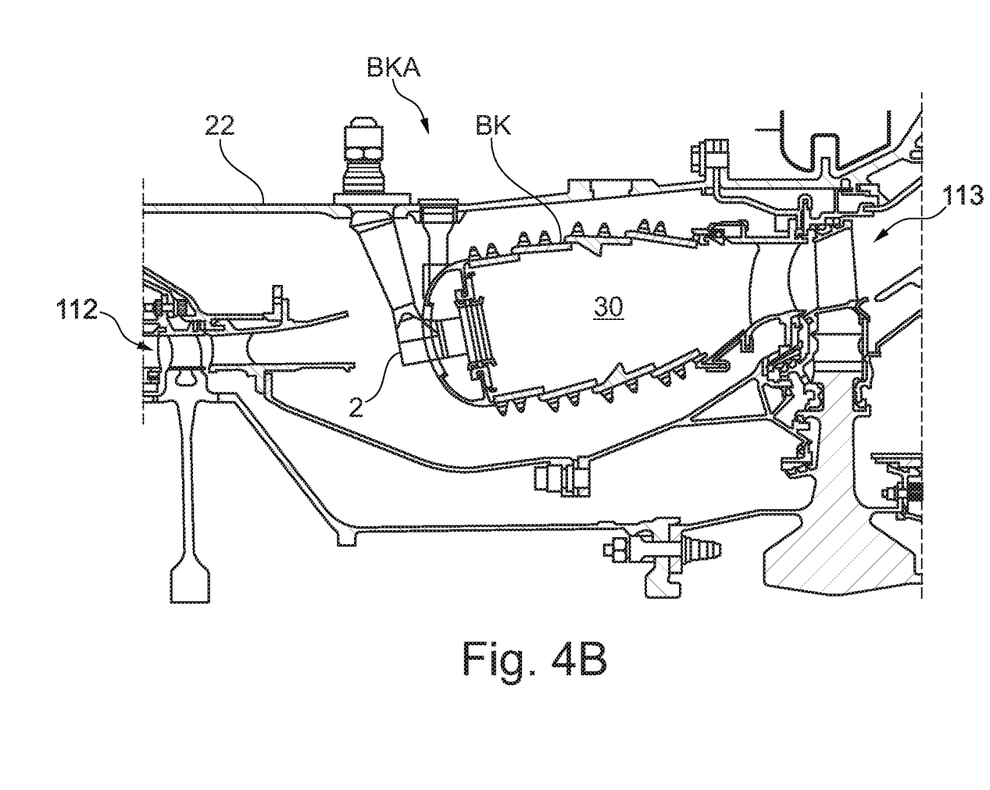
FIG. 4B shows a schematic sectional illustration of a combustion chamber of the gas turbine engine of FIG. 4A.

FIG. 4B shows a longitudinal section through the combustion chamber BK of the engine T. The combustion chamber BK is designed here as an annular combustion chamber which forms part of an embodiment variant of a proposed combustion chamber assembly. A nozzle assembly is provided for the injection of fuel or an air-fuel mixture into a combustion space 30 of the combustion chamber BK. Said nozzle assembly comprises a combustion chamber ring, on which multiple fuel nozzles 2 are arranged along a circular line around the central axis M. Here, on the combustion chamber ring, there are provided the nozzle outlet openings of the respective fuel nozzles 2 which are situated within the combustion chamber BK. Here, each fuel nozzle 2 comprises a flange by means of which a fuel nozzle 2 is screwed to an outer casing 22.

Figure 4C:
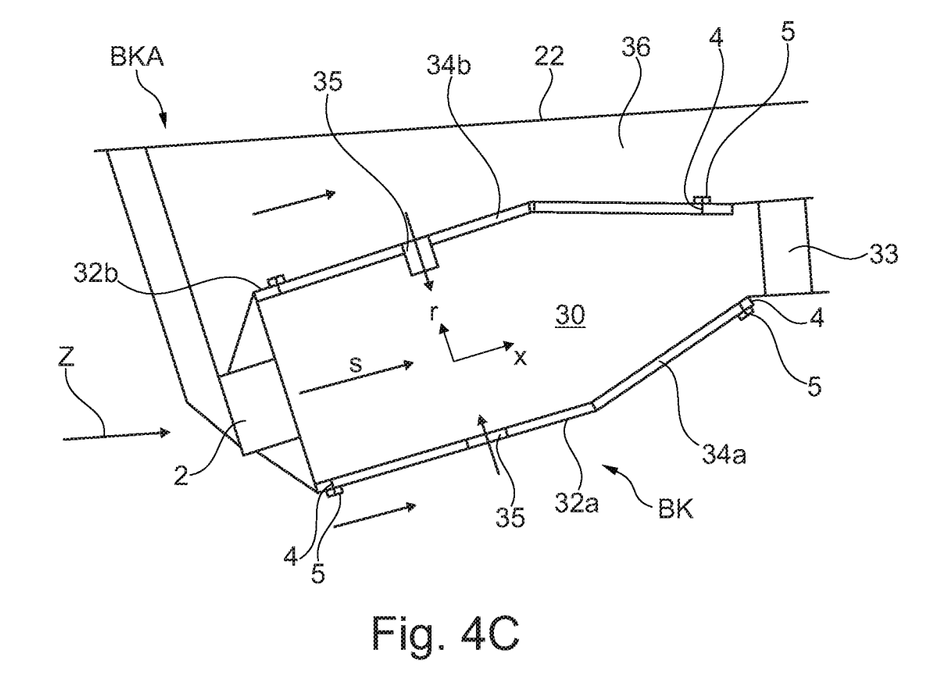
FIG. 4C shows a segment of an enlarged sectional illustration of a combustion chamber with a combustion chamber shingle.

A configuration of the combustion chamber BK is illustrated specifically in the enlarged sectional illustration of FIG. 4C. The combustion chamber BK here comprises the fuel nozzle 2 which is held in a combustion chamber head. The fuel nozzle 2 is used to inject fuel into the combustion space 30 of the combustion chamber BK. The exhaust gases of the mixture ignited within the combustion space 30 pass in an axial direction x via a turbine inlet guide vane row 33 to the high-pressure turbine 113 in order to set the turbine stages into rotation. The combustion chamber BK therefore extends in the axial direction x from a first axial end with a combustion chamber head to a second axial end at which the exhaust gases arising in the combustion space 30 during the combustion are conducted to the high-pressure turbine 113 in order to generate thrust.

The combustion space 30 is bounded by, with respect to the central axis M of the engine T, radially inner and radially outer combustion chamber walls 32*a*, 32*b* of a combustion chamber housing of the combustion chamber BK, said combustion chamber walls each extending, on the one hand, along the axial direction x and, on the other hand, along a circumferential direction U (cf. FIGS. 1 and 2) about said axial direction x. The combustion chamber walls 32*a* and 32*b* therefore extend, on the one hand, along the axial direction x along the central axis M and along the circumferential direction U. A radial direction r runs perpendicularly both to the axial direction x and to the circumferential direction. Along said radial direction r, air flows, for example, via mixing air holes 35 into the combustion space 3.

Combustion chamber shingles 34a, 34b are arranged on the inner side of the combustion chamber walls 32a, 32b. The combustion chamber walls 32a, 32b therefore surround the combustion space 30 of the combustion chamber BK and bear the combustion chamber shingles 34a, 34b, with which the combustion chamber walls 32a, 32b are lined in order to permit additional cooling and to withstand the high temperatures prevailing in the combustion space 30.

The combustion chamber shingles 34a, 34b are each held here on the respective inner or outer combustion chamber wall 32a, 32b via one or more bolts 4. Each bolt 4 reaches here through an opening on the combustion chamber wall 32a or 32b and is fixed to the combustion chamber wall 32a or 32b via a respective nut 5. For example, a plurality of effusion cooling holes provided on a combustion chamber shingle 34a or 34b make it possible to cool the respective combustion chamber shingle 34a or 34b. In addition, a combustion chamber shingle 34a, 34b can have at least one admixing hole via which air can flow into the combustion space 30 from a surrounding exterior space. The air flowing via an admixing hole is used here for cooling and/or leaning of the combustion.

The exterior space surrounding the combustion chamber BK, for example in the form of an annular duct, forms an air supply 36 for the mixing air holes 35 (and possible effusion cooling holes). Air flowing into the combustion chamber BK along an inflow direction Z is divided here at the first axial end in the region of the fuel nozzle 2 via a section configured in the manner of a hood into a primary air flow for the combustion space 30 and a secondary air flow for the surrounding exterior space with the air supply 36. The air conventionally flows here into the combustion chamber BK via a diffusor (not illustrated).

Figure 1:
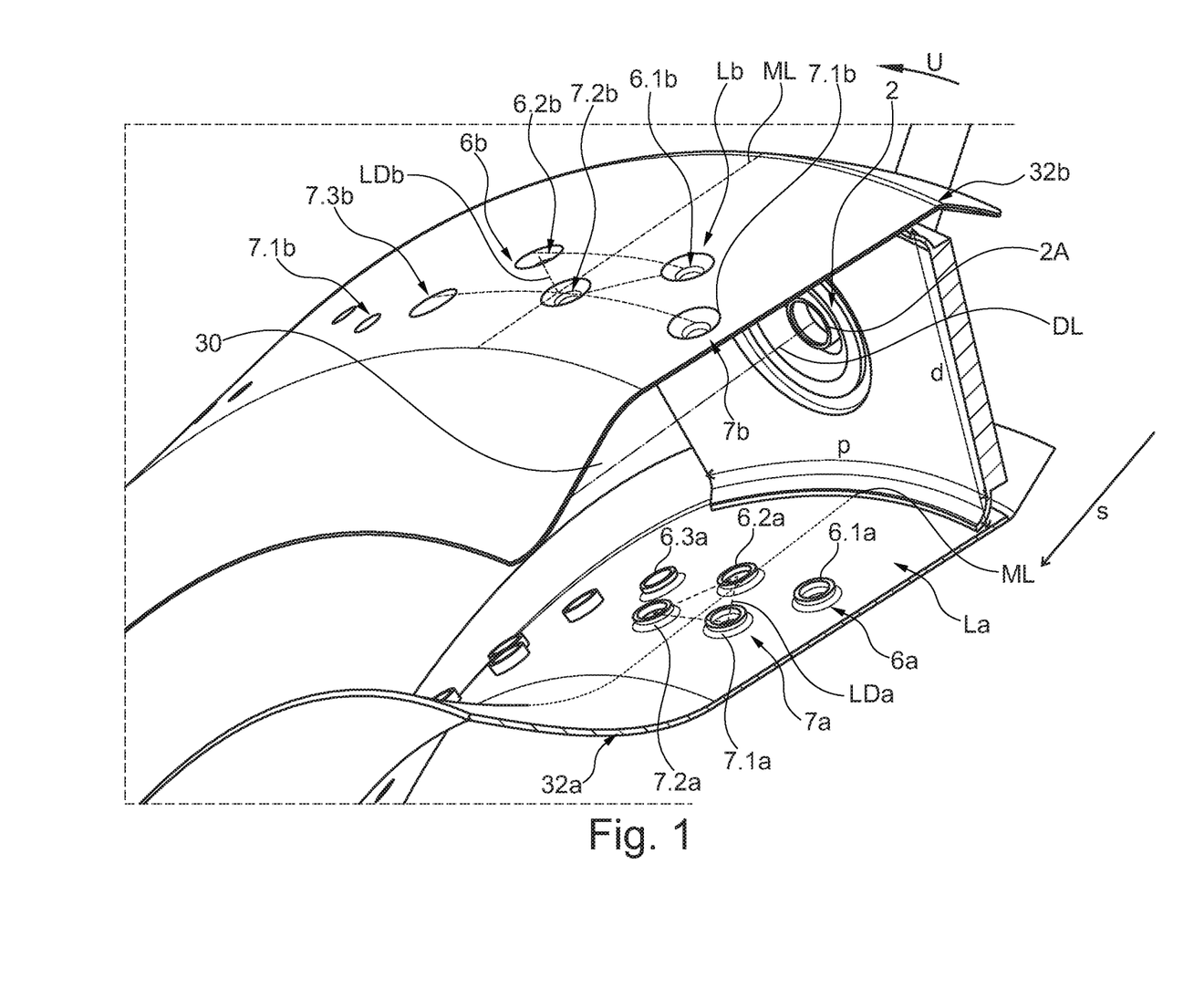
FIG. 1 shows a segment, in a perspective view, of part of an embodiment variant of a proposed combustion chamber assembly with specific mixing air hole arrangements on inner and outer combustion chamber walls downstream of a nozzle head of a fuel nozzle.
Figure 2:
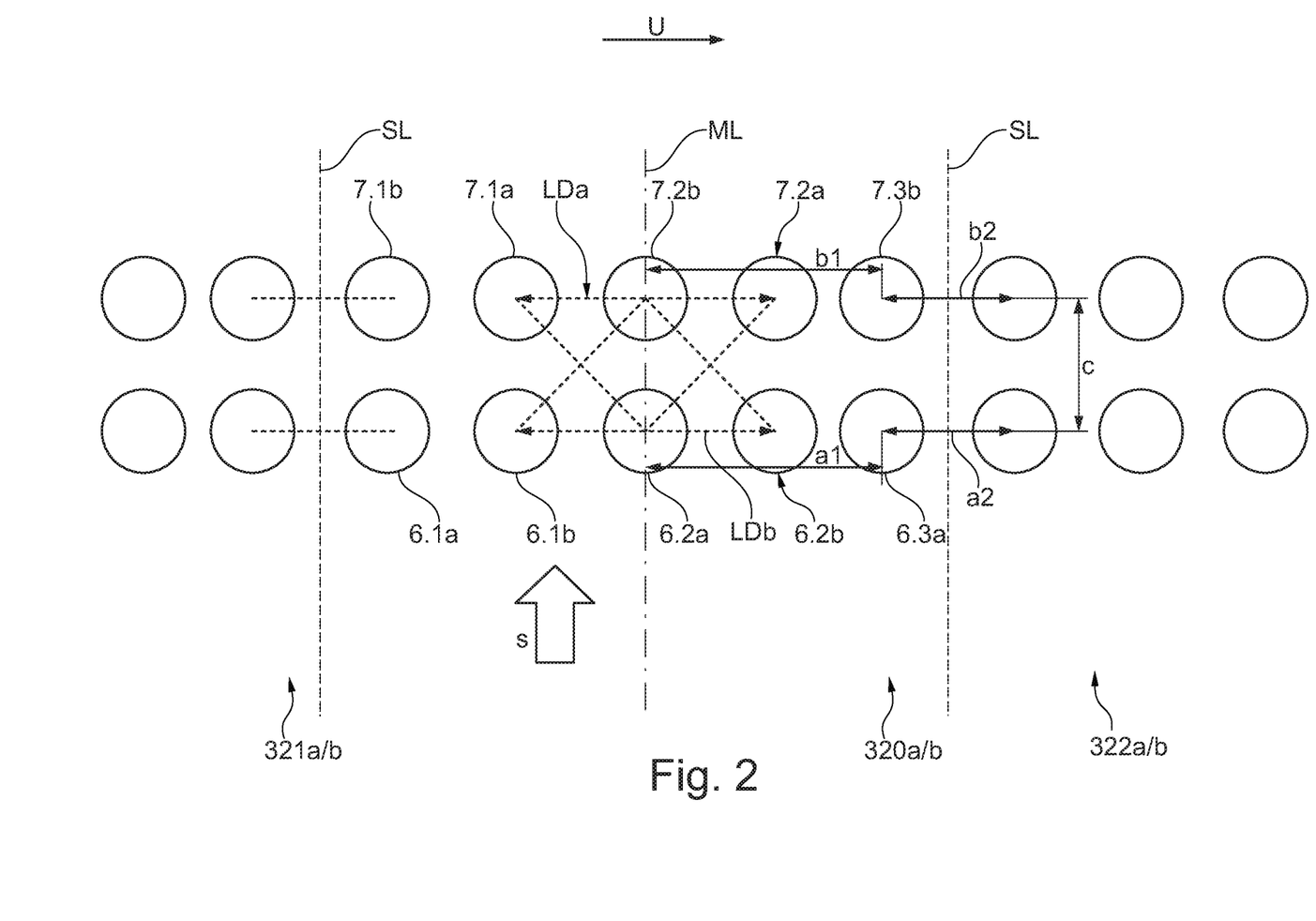
FIG. 2 shows the mixing air hole arrangement on the inner and outer combustion chamber walls of the combustion chamber assembly of FIG. 1 in a top view.
Figure 3:
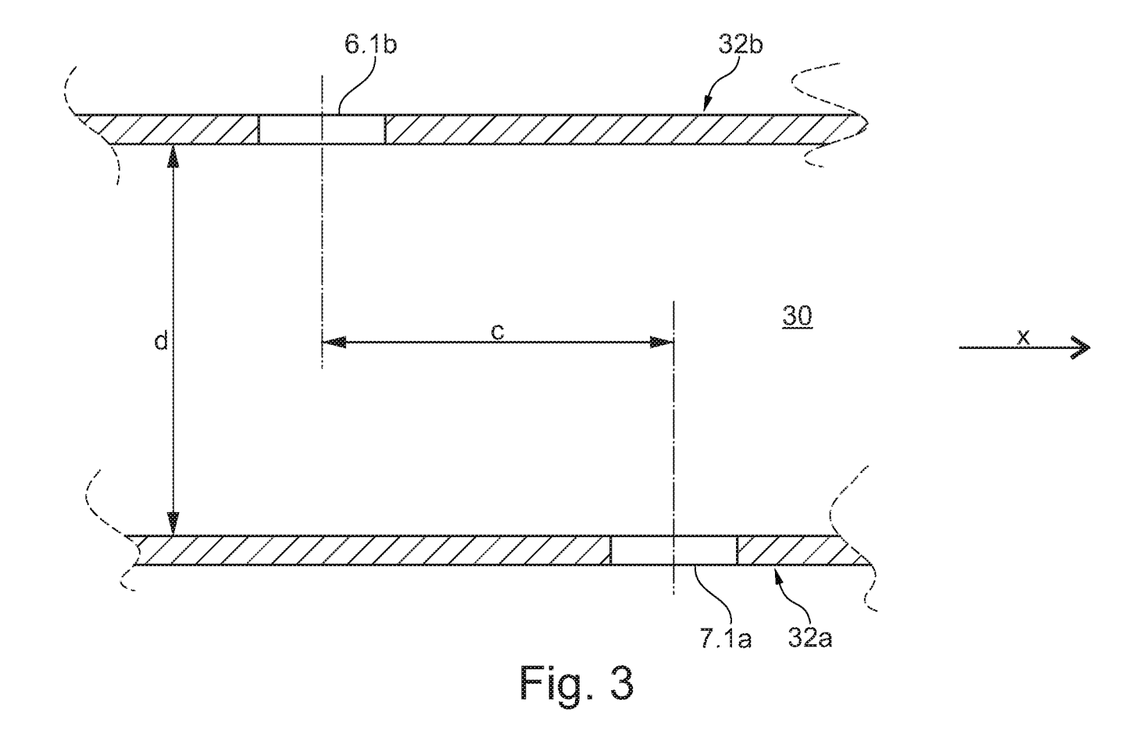
FIG. 3 shows part of the combustion chamber assembly of FIGS. 1 and 2 in a cross section.

FIGS. 1, 2 and 3 show, with a greater degree of detail, embodiment variants of the proposed solution, for illustrating special arrangements for the mixing air holes 35 on the inner and outer combustion chamber walls 32a and 32b. The mixing air holes are denoted here by 6.1a-6.3a, 7.1a-7.2a and 6.1b-6.2b, 7.1b-7.3b and are provided in certain patterns repeating segment by segment in the circumferential direction U on the inner and outer combustion chamber walls 32a and 32b. The positions of the mixing air holes 6.1a-6.3a, 7.1a-7.2a and 6.1b-6.2b, 7.1b-7.3b are furthermore coordinated with one another such that, in particular in the case of a combustion space 30 with a comparatively large pitch-height ratio, a particularly advantageous mixing air flow downstream of a fuel nozzle 2 is produced.

FIG. 1 perspectively shows a segment of the combustion space 30 looking at the front axial face end together with a segment of an annular heat shield, at the opening of which a nozzle head 2A of the fuel nozzle 2 projects into the combustion space 30 in order to inject fuel into the combustion space 30. The height of the combustion space 30 is defined by a distance d between the opposite combustion chamber walls 32a and 32b at the first axial end in the region of the nozzle head 2A, the distance corresponding to the height of the heat shield segment. The pitch of the combustion space is defined in turn by a width p which measures the heat shield segment carrying the nozzle head 2A and therefore also a respective segment of the inner and outer combustion chamber wall 32a, 32b in the circumferential direction U.

The inner combustion chamber wall 32a and the outer combustion chamber wall 32b can be divided in the present case (virtually) into individual wall segments which follow one another in the circumferential direction U and on which respectively recurring patterns for the mixing air holes provided on said wall segments are predefined. In the present case, five mixing air holes 6.1a-6.3a, 7.1a-7.2a or 6.1b-6.2b, 7.1b-7.3b are in each case provided per wall segment. The mixing air holes on a respective wall segment are provided symmetrically with respect to an axis of symmetry ML on the respective wall segment. This axis of symmetry ML runs parallel to a nozzle axis DL along which the nozzle head 2A of the fuel nozzle 2 extends and which therefore corresponds to the main direction of flow of fuel from the nozzle head 2A in the direction of the combustion space outlet.

A mixing air hole arrangement La or Lb for the respective five mixing air holes 6.1a-6.3a, 7.1a-7.2a or 6.1b-6.2b, 7.1b-7.3b is provided on each wall segment of the inner or outer combustion chamber wall 32a, 32b. Each mixing air hole arrangement La, Lb has precisely two rows 6a, 7a or 6b, 7b of mixing air holes. The five mixing air holes 6.1b-6.2b, 7.1b-7.3b of the outer combustion chamber wall 32b are each arranged segment by segment inversely with respect to the mixing air holes 6.1a-6.3a, 7.1a-7.2a of the inner combustion chamber wall 32a. In particular, three mixing air holes 6.2a, 7.1a and 7.2a are arranged with their central points at corner points of a virtual first isosceles triangle LDa on a wall segment of the inner combustion chamber wall 32a, with the tip of said first isosceles triangle LDa and therefore the central point of the mixing air hole 6.2a of the front row 6a lying on the axis of symmetry ML.

A second isosceles triangle LDb, at the corner points of which the central points of the three mixing air holes 6.1b, 6.2b and 7.2b are located, is provided on the opposite wall segment of the outer combustion chamber wall 32b in a manner rotated by 180° with respect to the first isosceles triangle LDa. Said three mixing air holes 6.1b, 6.2b and 7.2b of the wall segment of the outer combustion chamber wall 32b and the three mixing air holes 6.2a, 7.1a and 7.2a of the wall segment of the inner combustion chamber wall 32a are positioned inversely such that a mixing air hole of the inner combustion chamber wall 32a is not faced by any mixing air hole of the opposite outer combustion chamber wall 32b. Six mixing air flows which are spatially offset from one another are therefore produced downstream of the nozzle head 2A. The production of locally separated mixing air flows in a comparatively compact space downstream of the nozzle head 2A via the groups of mixing air holes 6.2a, 7.1a, 7.2a and 6.1b, 6.2b 7.2b has proven particularly advantageous for efficient thorough mixing of fuel and mixing air in a combustion space 30 having a comparatively large pitch-height ratio p/d.

FIG. 2 here clarifies the mixing air hole arrangements La, Lb across a plurality of wall segments of the inner and outer combustion chamber walls 32a, 32b. FIG. 2 shows a top view with a viewing direction perpendicular to the circumferential direction U and perpendicular to the main direction of flow s, and therefore perpendicular to the axial direction x.

FIG. 2 illustrates segments of three wall segments 321b, 320b and 322b, lying next to one another, of the outer combustion chamber wall 32b and the associated opposite wall segments 321a, 320a, 322a of the inner combustion chamber wall 32a. Wall segments of a combustion chamber wall 32a, 32b are separated in pairs from one another by (virtual) segment boundary lines SL. The mixing air arrangements La or Lb of the wall segments 321b, 320b, 322b and 321a, 320a and 322a are in each case axially symmetrical to the axis of symmetry L on a wall segment 320a/b, 321a/b or 322a/b. Furthermore, a mixing air arrangement La or Lb of a wall segment is in each case inverse to an opposite wall segment of the other combustion chamber wall 32a, 32b.

In the top view of FIG. 2, a first mixing air hole 6.2a of the front row 6a of a first wall segment 320a (of the inner combustion chamber wall 32a) and a first mixing air hole 7.2b of the rear row 7b of a second wall segment 320b (of the outer combustion chamber wall 32b) are provided one behind another along the axis of symmetry ML. Said first mixing air holes 6.2a and 7.2b are therefore arranged axially offset only in the axial direction x and therefore in the main direction of flow s of the fuel injected via the nozzle head 2A. These two first mixing air holes 6.2a and 7.2b are arranged here at a tip of the respective virtual isosceles triangle LDa or LDb, the tips predefining the spatial arrangement of the central three mixing air holes (of a total of five mixing air holes) on a respective wall segment 320a or 320b. Accordingly, two mixing air holes 7.1a and 7.2a are provided in the rear row 7a on the wall segment 320a of the inner combustion chamber wall 32a, the central points of which mixing air holes lie at the other corner points of the first virtual triangle LDa and which are therefore spaced apart from one another at a distance a1 which corresponds to the length of the base of the virtual first triangle LDa. Inversely thereto, mixing air holes 6.1b and 6.2b which lie with their central points at the corner points of the other, second virtual triangle LDb are provided on the front row 6b of the wall segment 320b of the outer combustion chamber wall 32b. Said central points are provided at a distance b1 from one another that corresponds to the length of the base of the virtual second triangle LDb (where here a1=b1).

In a respective front or rear row 6a or 7b of the two rows of mixing air holes following one another in the axial direction x, by way of which row one mixing air hole 6.2a or 7.2b lying on the axis of symmetry ML is provided on the respective wall segment 320a or 320b, the two further mixing air holes 6.1a, 6.3a or 7.1b, 7.3b are in each case arranged in the circumferential direction U. By contrast, the respective other row 7a or 6b continues to have the two mixing air holes, the centre points of which lie at the corner points of the respective virtual triangle LDa, LDb.

The additional (fourth and fifth) mixing air holes 6.1a, 6.3a of the front row 6a on the wall segment 320a, or the additional (fourth and fifth) mixing air holes 7.1b, 7.3b of the rear row 7b on the wall segment 320b are in each case provided at a distance from the respective central mixing air hole 6.2a or 7.3b of the respective row 6a or 7b, which distance likewise corresponds to the length of the base of the respective virtual triangle LDa or LDb.

A row 6a or 7b with three mixing air holes 6.1a-6.3a or 7.1b-7.3b is adjoined at a distance a2 or b2 in the circumferential direction U by a respective mixing air hole of a neighbouring segment 322a or 322b. This distance a2 or b2 corresponds here to half the length of the base of the respective virtual triangle LDa, LDb and therefore to half of the distance a1 or b1. In a respective other row 7a or 6b of the same wall segment 320a or 320b, in which precisely two mixing air holes 7.1a, 7.2a or 6.1b, 6.2b are provided, a new mixing air hole follows in the circumferential direction U on a neighbouring segment 322a or 322b only at a greater distance. In the embodiment variant illustrated, a distance of ³⁄₂ a1 or ³⁄₂ b1 is provided here by way of example. At least for one group of rows 6a, 7b of adjacent wall segments 321a/b, 320a/b, 322a/b following one another in the circumferential direction U, this results in a local concentration of mixing air holes in the region of the segment boundaries SL with an accumulation of mixing air holes, axially offset with respect thereto, on the respective other combustion chamber wall. This is likewise required for moderating the temperature of the fuel-air mixture produced beyond the segment boundaries SL.

The two rows of wall segments 321a/b, 320a/b and 322a/b are each provided at an axial row distance c from one another. This row distance c is predefined here with respect to the wall distance d. Thus, the intention for the row distance c is that it lies in the range of 0.05 d to 0.4 d. As is illustrated with reference to the sectional illustration of FIG. 3, mixing air holes, which are offset axially from one another, of the outer and inner combustion chamber walls 320a, 320b are therefore present at a comparatively small distance from one another. This leads in combination with the inverse arrangement, which is repeating segment by segment, of the mixing air arrangements La, Lb, specifically in the case of the comparatively large pitch-height ratio p/d illustrated here, to an extremely efficient mixing of the fuel, which is injected in each case at the nozzle head 2A, with supplied mixing air with a comparatively uniform temperature distribution at the combustion chamber outlet. The result is comparatively low NOx emissions in the combustion of the fuel-air mixture.

LIST OF DESIGNATIONS

111 Low-pressure compressor
112 High-pressure compressor
113 High-pressure turbine
114 Medium-pressure turbine
115 Low-pressure turbine
2 Fuel nozzle
2A Nozzle head
22 Outer housing
30 Combustion space
32a, 32b Inner/outer combustion chamber wall
320a, 320b Segment
321a, 321b, 322a, 322b Neighbouring segment
33 Turbine inlet guide vane row
34a, 34b Inner/outer combustion chamber shingle
35 Mixing air hole
36 Air supply
4 Bolt
5 Nut
6.1a, 6.2a, 6.3a Mixing air hole
6.1b, 6.2b
6a, 6b 1st row of mixing air holes
7.1a, 7.2a, Mixing air hole
7.1b, 7.2b, 7.3b
7a, 7b 2nd row of mixing air holes
A Outlet
a1, a2, b1, b2 Distance
B Bypass duct
BK Combustion chamber
c Axial row distance
C Outlet cone
d Wall distance
DL Nozzle axis
E Inlet/intake
F Fan F1, F2 Fluid flow
FC Fan casing
La, Lb Mixing air hole arrangement
LDa, LDb Triangle
M Central axis/axis of rotation
ML Axis of symmetry
p Width/pitch
r Radial direction
R Manufacturing direction
S Rotor shaft
s Main direction of flow
SL Segment boundary line
T (Turbofan) engine
TT Turbine
U Circumferential direction
V Compressor
x Axial direction
Z Inflow direction

The invention claimed is:

1. A combustion chamber assembly, having a combustion chamber for an engine, comprising:
   an inner combustion chamber wall and an outer combustion chamber wall for bounding a combustion space of the combustion chamber,
   the combustion chamber extending along a central axis in an axial direction from a first axial end to a second axial end,
   mixing air holes arranged in rows extending along a circumferential direction about the central axis, the rows including a first set of two rows extending through the inner combustion chamber wall and a second set of two rows extending through the outer combustion chamber wall, each of the first set of two rows and the second set of two rows respectively including a second row positioned aft of a first row in the axial direction, the mixing air holes being configured for conducting mixing air into the combustion space,
   both the inner combustion chamber wall and the outer combustion chamber wall being divided in the circumferential direction into wall segments on which the mixing air holes are arranged in a predefined pattern, wherein:
   three first mixing air holes of the first set of two rows are arranged with respective central points at corner points of a virtual first triangle on a first wall segment of the inner combustion chamber wall,
   three second mixing air holes of the second set of two rows are arranged with respective central points at corner points of a virtual second triangle on a second wall segment of the outer combustion chamber wall, and
   the virtual second triangle has an orientation rotated by 180° in the axial direction with respect to the virtual first triangle such that the three first mixing air holes are not directly opposite the three second mixing air holes, respectively,
   a fuel nozzle including a nozzle head and configured for injecting fuel into the combustion chamber, the nozzle head extending along a nozzle axis,
   a heat shield segment carrying the nozzle head of the fuel nozzle, wherein each of the first wall segment and the second wall segment has a width in the circumferential direction equal to a width of the heat shield segment,
   a plane of symmetry, the plane of symmetry established by the nozzle axis and at least one point on the central axis between the first axial end and the second axial end,
   wherein the virtual first triangle and the virtual second triangle are both isosceles triangles, wherein the virtual first triangle and the virtual second triangle are identical,
   wherein a tip of the virtual first triangle and a tip of the virtual second triangle lie on the plane of symmetry, and, in a top view along a viewing direction running perpendicularly to the axial direction and perpendicularly to the circumferential direction, both the virtual first triangle and the virtual second triangle are symmetrical with respect to the plane of symmetry,
   wherein the first set of two rows and the second set of two rows each respectively have a total of precisely five mixing air holes positioned on each of the first wall segment and the second wall segment, respectively, with each of the first wall segment and the second wall segment having two further mixing air holes, respectively, in addition to the three first mixing air holes and the three second mixing air holes.

2. The combustion chamber assembly according to claim 1, wherein a first distance measured in the circumferential direction between each of the two further mixing air holes and the plane of symmetry on each of the first wall segment and the second wall segment is greater than a second distance between the each of the two further mixing air holes and mixing air holes arranged in further wall segments circumferentially adjacent the first and second wall segments.

3. The combustion chamber assembly according to claim 2, wherein the first distance is twice the second distance.

4. The combustion chamber assembly according to claim 1, wherein a first distance measured in the circumferential direction between each of the two further mixing air holes and the plane of symmetry on the first wall segment corresponds to a length of a base of the virtual first triangle.

5. The combustion chamber assembly according to claim 1, wherein a first distance measured in the circumferential direction between each of the two further mixing air holes and the plane of symmetry on the second wall segment corresponds to a length of a base of the virtual second triangle.

6. The combustion chamber assembly according to claim 1, wherein an axial distance between each row of the first set of two rows and the second set of two rows, respectively lies in a range of 0.05 d to 0.4 d, where d is a distance between the first and second wall segments.

7. A gas turbine engine having at least one of the combustion chamber assembly according to claim 1.

8. The combustion chamber assembly according to claim 1, wherein the precisely five mixing air holes positioned on each of the first wall segment and the second wall segment are both symmetrical with respect to the plane of symmetry.

* * * * *